United States Patent
Warmka

[11] Patent Number: 6,134,083
[45] Date of Patent: Oct. 17, 2000

[54] SELF-LOADING HEAD SLIDER HAVING ANGLED LEADING RAILS AND NON-DIVERGENT NOTCHED CAVITY DAM

[75] Inventor: Scott R. Warmka, Edmond, Okla.

[73] Assignee: Seagate Technology LLC, Scotts Valley, Calif.

[21] Appl. No.: 09/158,202

[22] Filed: Sep. 22, 1998

Related U.S. Application Data

[60] Provisional application No. 60/075,735, Feb. 24, 1998.

[51] Int. Cl.⁷ ................................................. G11B 21/21
[52] U.S. Cl. .................... 360/235.6; 360/236; 360/236.1
[58] Field of Search ........................... 360/103, 234–237, 360/237.1

[56] References Cited

U.S. PATENT DOCUMENTS

| | | | |
|---|---|---|---|
| 5,062,017 | 10/1991 | Strom et al. | 360/103 |
| 5,128,822 | 7/1992 | Chapin et al. | 360/103 |
| 5,210,666 | 5/1993 | Chapin et al. | 360/103 |
| 5,377,063 | 12/1994 | Taniguchi et al. | 360/103 |
| 5,396,387 | 3/1995 | Murray | 360/103 |
| 5,430,591 | 7/1995 | Takeuchi et al. | 360/103 |
| 5,515,219 | 5/1996 | Ihrke et al. | 360/103 |
| 5,624,581 | 4/1997 | Ihrke et al. | 360/103 |
| 5,721,650 | 2/1998 | Crane et al. | 360/103 |
| 5,889,634 | 3/1999 | Chang et al. | 360/103 |
| 5,910,865 | 6/1999 | Wang et al. | 360/103 |
| 5,973,880 | 10/1999 | Hashimoto et al. | 360/103 |

FOREIGN PATENT DOCUMENTS

| | | |
|---|---|---|
| 60-242548 | 12/1985 | Japan. |
| 1-245480 | 9/1989 | Japan. |
| 9-180147 | 7/1997 | Japan. |

*Primary Examiner*—Craig A. Renner
*Attorney, Agent, or Firm*—Westman, Champlin & Kelly, P.A.

[57] ABSTRACT

A self-loading disc head slider includes first and second raised bearing surfaces having outside bearing edges which diverge from one another along a leg portion which extends from a leading portion to a waist portion of the first and second bearing surfaces. A cavity dam defines a sub-ambient pressure cavity between the first and second bearing surfaces. A leading contour extends from a leading slider edge an intersection with first and second bearing surfaces. A notch is positioned within a central region of the leading contour between the first and second bearing surfaces and has first and second side walls which extend from the leading slider edge to the sub-ambient pressure cavity, through the cavity dam. At least one of the side walls is non-divergent from a longitudinal slider center line at the intersection in a direction from the leading slider edge toward a trailing slider edge.

18 Claims, 6 Drawing Sheets

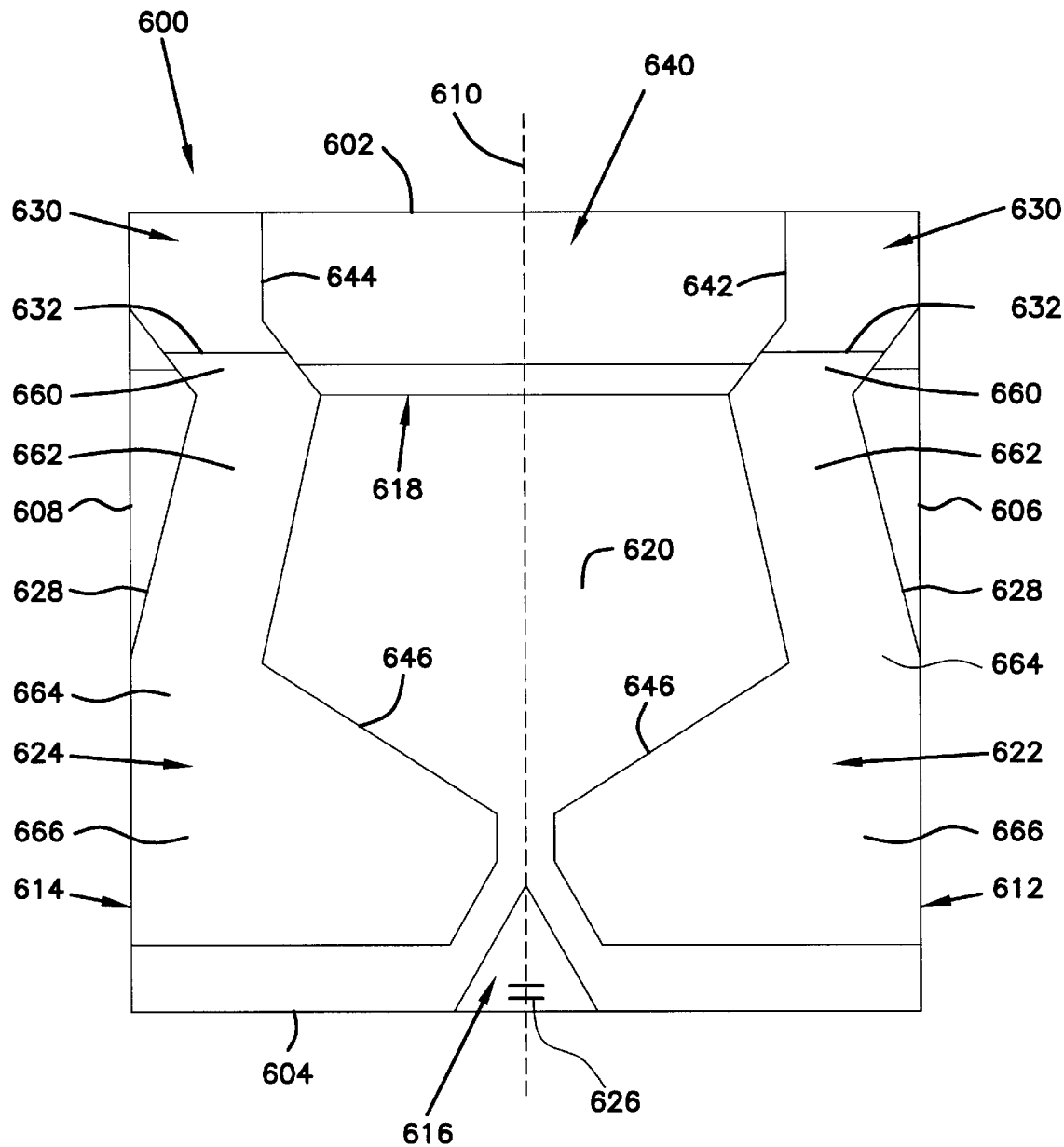

SELF-LOADING HEAD SLIDER HAVING ANGLED LEADING RAILS AND NON-DIVERGENT NOTCHED CAVITY DAM

CROSS-REFERENCE TO RELATED APPLICATION

This application claims the benefit of U.S. Provisional Patent Application No. 60/075,735, entitled "SELF-LOADING HEAD SLIDER" and filed on Feb. 24, 1998.

BACKGROUND OF THE INVENTION

The present invention relates to disc drive storage systems and, more particularly, to a disc drive storage system having a slider with angled leading rails and a notched cavity dam.

Disc drives of the "Winchester" type are well known in the industry and include hydrodynamic (e.g. air) bearing sliders which carry recording heads for communicating with the disc surface. Each slider has an air bearing surface which faces its respective disc surface. The bearing clearance between the slider and the disc surface at the recording head is an important parameter to disc drive performance. It is desired to minimize variation in the head clearance or "flying height".

One source of flying height variation in a disc drive is a variation in the disc surface velocity from the disc inner diameter (ID) to the disc outer diameter (OD). Another source is from normal process variations of manufacturing parameters including those related to external loading of the slider, such as the suspension preload and the suspension "pitch static angle" (PSA), and the length of a leading taper which is formed at the leading edge of the bearing surface of the slider.

Self-loading or "negative pressure" air bearing (NPAB) surfaces have been used in the disc drive industry for many years for reducing flying height variation. Self-loading air bearing surfaces have several common features, including the leading taper, a pair of raised side rails, a cross rail and a sub-ambient pressure cavity. The leading taper is lapped onto the end of the slider that is opposite to the recording head. As the disc rotates, the disc drags air under the slider along the air bearing surfaces in a direction approximately parallel to the tangential velocity of the disc. The leading taper pressurizes the air as the air is dragged under the slider by the disc surface. Disc pressurization creates a lifting force that causes the slider to lift and fly above the disc surface. The lifting force increases the bearing load capacity of the slider. An additional effect of the leading taper is that the pressure distribution under the slider has a peak near the taper end or "leading edge" due to the high compression angle of the taper, and a second peak near the recording end or "trailing edge" due to a low bearing clearance required for efficient magnetic recording. This dual-peak pressure distribution results in an air bearing with a high pitch stiffness. A high pitch stiffness results in a head flying height which is relatively insensitive to process variations in the suspension pitch static angle ("PSA").

The pair of raised side rails extends downstream from the taper. The side rail closest to the disc hub is called the "inner rail" and the side rail closest to the disc rim is called the "outer rail". The rails may extend from the taper to the trailing edge, in which case there are usually two heads, with one head mounted near the trailing end of each rail. Alternatively, there may be a single head mounted on a center rail or island positioned at the trailing edge. In this case, the raised side rails are typically truncated prior to the trailing edge. With the dual-peak pressure distribution, if the side rails are positioned along the side edges of the slider, the slider develops an air bearing with a high rolling stiffness and an insensitivity to the suspension roll static angle ("RSA").

The sub-ambient pressure cavity is positioned between the inner and outer rails. The sub-ambient pressure cavity is open to the atmosphere at the trailing edge, and is bounded by the cross rail located near the leading edge. The cross rail extends between the inner rail and the outer rail. The cross rail provides an expansion path for the air to depressurize as it is dragged into the sub-ambient pressure cavity by the disc velocity. The expanded air in the cavity provides a self-loading force which forces the slider toward the disc surface. The counteraction between the increased bearing load, the preload force and the self-loading force provides the air bearing with a high vertical stiffness and an insensitivity to variations in the suspension preload.

A further source of flying height variation is from environmental conditions such as altitude. Air bearing fly height loss at high altitude is becoming an increasing concern, especially in mobile applications with magnetoresistive heads and low nominal head-disc separation. In these applications, the operating environment for any single disc drive can include varying atmospheric pressure such as when an end user at sea level carries a notebook computer onto an airplane that is pressurized to 10,000 feet in flight. The air bearing performance over varying atmospheric pressure is governed by the Reynolds equation. The air bearing load can be obtained by solving the Reynolds equation for pressure and then integrating the pressure over the bearing area. From the Reynolds equation, the bearing load can be shown to be a function of the bearing number, which is a measure of the compressibility of the air under the air bearing surface. The bearing number is proportional to the disc surface velocity and is inversely proportional to the atmospheric pressure and the square of the characteristic film thickness. For calculating the lift force, the characteristic film thickness is the close point flying height of the slider. For calculating the self-loading force, the characteristic film thickness is the cavity depth.

The bearing load is determined by the combination of the load carrying effects of the ambient pressure and the bearing induced compressibility which is determined by the disc surface velocity and the characteristic film thickness. When the bearing number is small, either the bearing's ability to compress or expand air is not saturated or the ambient pressure effect is saturated. Therefore, the bearing load is dominated by the compressibility effect and is independent of ambient pressure. When the bearing number is large, the bearing's ability to compress or expand air is saturated and the bearing load is proportional to ambient pressure. The bearing number for the lifting force is very large for all disc drive applications.

The ambient pressure is reduced with increasing altitude. Therefore, the loss of lifting force is substantial at high altitude, where ambient pressure is low. Loss of lifting force is equivalent to loss of fly height. Also, the mean free path of air increases with altitude. This increased mean free path increases side leakage of air along the side edges of the rails and further lowers air bearing fly height.

Fly height sensitivity to altitude can be reduced by compensating lifting force loss with self-loading force loss. If the self-loading force loss is the same as the lifting force loss, then the fly height is virtually insensitive to altitude change, without considering the pitch angle and roll components of the slider. The cavity bearing number is small if the cavity depth is deep or if the disc surface velocity is low. For a low cavity bearing number, the self-loading force is not reduced with increasing altitude or with decreasing ambient pressure. Since the lifting force is reduced with increasing altitude and the self-loading force is not reduced with increasing altitude, the fly height loss with high altitude is severe.

When the cavity depth is shallow or when the disc surface velocity is high, the cavity bearing number is large. Thus, the self-loading force is greatly reduced at high altitude, which can compensate for the lifting force loss and thereby minimize fly height loss at high altitude. For low disc surface velocity applications, such as with mobile products, the typical range of cavity depth for minimizing fly height loss with altitude is about 2–4 micrometers.

In addition to accommodating exposure to a wide range of ambient pressures, mobile disc drive products have inherent constraints related to minimizing power consumption and improving reliability. One measure of reliability is the minimum number of successful contact start and stop ("CSS") cycles in a particular disc drive. Power consumption and reliability are not necessarily independent of one another. Power saving strategies can include shutting down the disc spindle motor during long idle times, thereby causing an additional CSS cycle without fully shutting off the disc drive.

One way to minimize power consumption is to spin the disc at the slowest speed allowable to meet the data rate requirements for the disc drive. Smaller form factors of mobile disc drive products and reduced spindle speeds combine to create large cavity bearing numbers. As described above, it is then necessary to have a shallow cavity depth for minimizing fly height loss with altitude. One method for improving both power consumption and CSS performance is to use a low preload force.

When the slider is a rest on the disc surface, asperities on the slider and the disc surface are in contact with one another. Two types of forces are created by this asperity contact, "stiction" forces and meniscus shear forces. Stiction forces are friction forces between the slider and the disc, which oppose relative motion between the slider and the disc as the disc starts to rotate. The contact element of stiction is determined by the microscopic contact area, the local material stress and the molecular interface bonding. This classic static friction component is substantially proportional to the applied normal force on the slider and can be reduced with lower suspension preload.

The combined surface roughness of the slider and the disc forms a capillary channel in which water condensate and excess disc lubrication act as a squeeze film. The meniscus shear force arises from the viscosity of the squeeze film and opposes relative motion between the slider and the disc. The squeeze film effect dominates when the capillary channel is filled. When the slider-disc interface is not saturated with a squeeze film as the motor starts, the maximum energy required by the motor can be reduced by reducing the preload and thus the stiction between the slider and disc.

As the disc continues to rotate and the squeeze film is de-wetted from the interface, work, which is proportional to the preload, is created from the dynamic friction of the sliding contact between the surfaces until the air bearing lift force is sufficient to separate the slider and the disc. The net work is the energy that is not dissipated by heat transfer. The net work that exceeds the fracture strain energy of the interface creates wear. Minimizing wear during a contact start-stop cycle is a key objective for satisfactory CSS performance. Because the work is proportional to the preload, wear can be reduced with lower preload. A typical maximum preload for adequate CSS performance is 5 gmf.

Wear can be further reduced by using a shallow cavity depth. The shallow cavity depth, such as desired for fly height insensitivity to altitude, generates a higher self-loading force than that for a deeper cavity. The higher self-loading force requires more air bearing rail surface area to maintain the same flying height when the disc is rotating at operating speed. At low disc speeds during spindle start, the cavity bearing number is quite low and there is little self-loading force generated, which translates to a lower take off speed for the slider, less distance in contact, and less wear energy.

For mobile disc drive applications, it is therefore desirable to provide the air bearing surface with a shallow cavity depth and a low preload. For the current range of disc surface velocities, a shallow leading taper angle of approximately 1.0 milliradians provides a head flying height that is essentially constant across the disc from ID to OD. However, because of process limitations, the leading taper angle is typically greater than 4.0 milliradians. These higher taper angles increase the higher surface pressurization from ID to OD. This tends to translate to an increased head flying height at the disc OD, thereby reducing the magnetic recording efficiency and the storage capacity of the disc drive.

A common technique for counteracting the pressurization characteristics of a high taper angle is to reduce the surface area of the leading taper, which also reduces the flying pitch angle of the slider. The reduced pitch angle better retains the air under the leading taper, forms the desired dual-peak pressure distribution and results in a high air bearing pitching stiffness that maintains a head flying height that is relatively insensitive to normal variations in suspension PSA.

Slider air bearing surface configurations have been developed that include a notch which reduces the surface area in a central region of the leading taper for reducing sensitivity to altitude and improved CSS performance in some applications. However, it has been found by the present inventors that these configurations can have low interface reliability when used in a mobile product with a shallow cavity depth and a low preload. The present invention provides a solution to these and other problems, and offers other advantages over the prior art.

SUMMARY OF THE INVENTION

The self-loading disc head slider of the present invention includes first and second raised bearing surfaces having outside bearing edges which diverge from one another along a leg portion which extends from a leading portion to a waist portion of the first and second bearing surfaces. A cavity dam defines a sub-ambient pressure cavity between the first and second bearing surfaces. A leading contour extends from a leading slider edge an intersection with first and second bearing surfaces. A notch is positioned within a central region of the leading contour between the first and second bearing surfaces and has first and second side walls which extend from the leading slider edge to the sub-ambient pressure cavity, through the cavity dam. At least one of the side walls is non-divergent from a longitudinal slider center line at the intersection in a direction from the leading slider edge toward a trailing slider edge.

BRIEF DESCRIPTION OF THE DRAWINGS

FIG. 6 is a plan view of a slider according to another embodiment of the present invention.

DETAILED DESCRIPTION OF THE PREFERRED EMBODIMENTS

Figure 1:
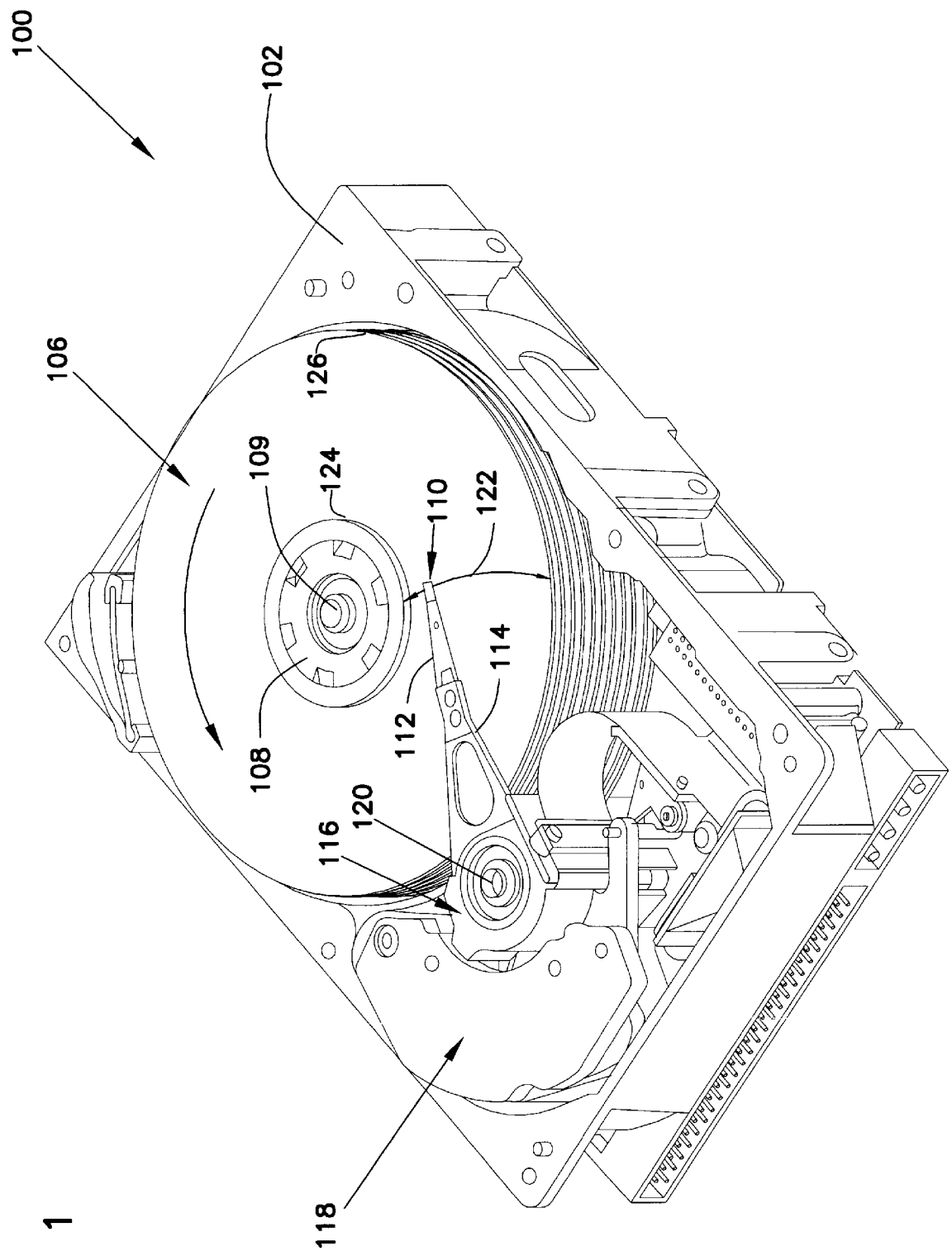
FIG. 1 is a perspective view of a disc drive data storage device in which the present invention is useful.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126.

Figure 2:
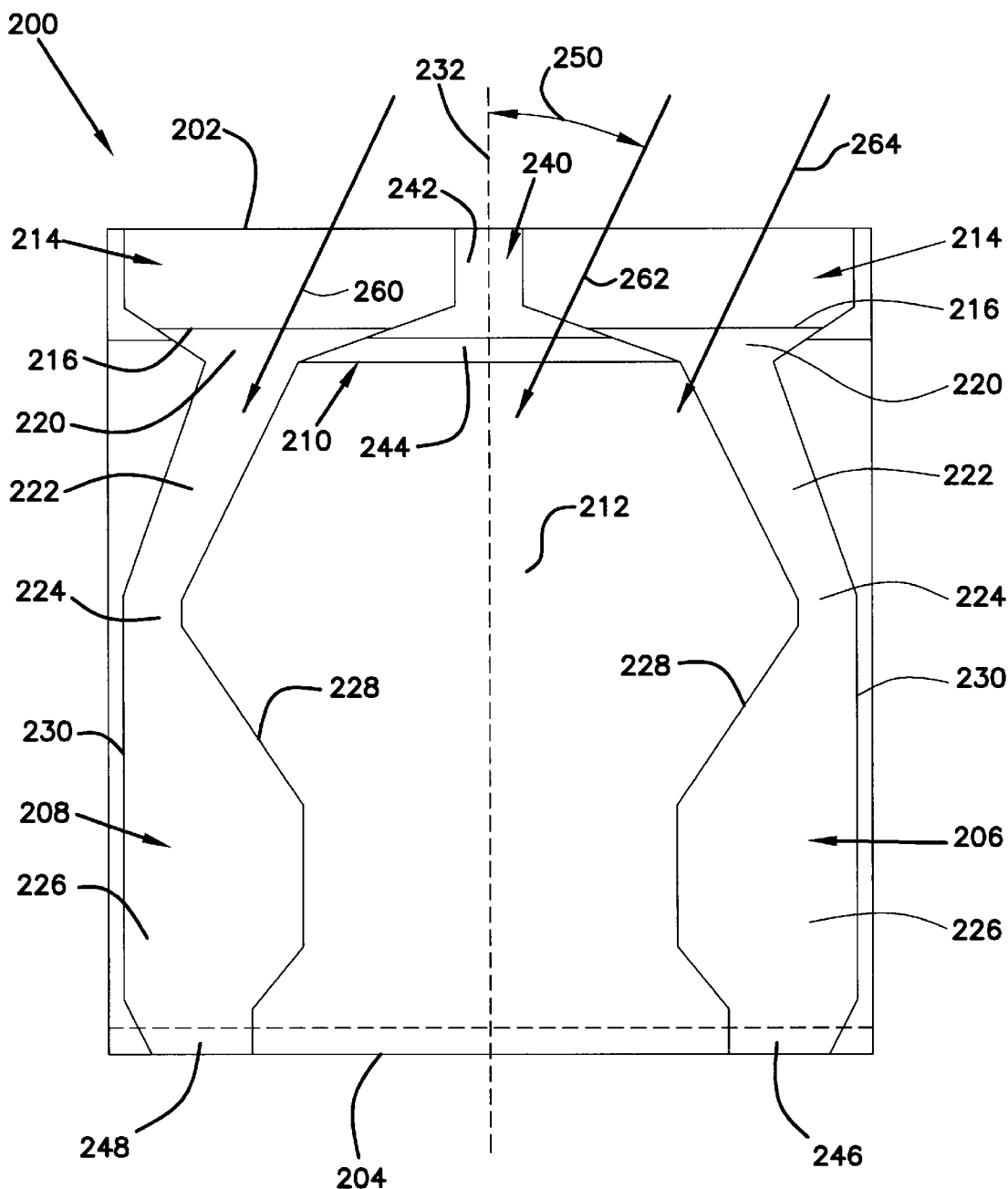
FIG. 2 is plan view of a slider of the prior art.

FIG. 2 is a perspective view of a slider of the prior art. Slider 200 includes leading edge 202, trailing edge 204, inner rail 206, outer rail 208, cavity dam 210, sub-ambient pressure cavity 212 and leading contour 214. Leading contour 214 is lapped along leading edge 202 and extends from leading edge 202 to an intersection 216 with the air bearing surfaces formed by rails 206 and 208. Rail 206 is an "inner" rail which, when mounted within a disc drive, is positioned closest to the inner disc diameter, and rail 208 is an "outer" rail which is positioned closest to the outer disc diameter.

Rails 206 and 208 each include a leading portion 220, a leg portion 222, a waist portion 224 and a trailing portion 226. Rails 206 and 208 further include inner edges 228 and outer edges 230. Inner edges 228 extend from leading edge 202 in a direction parallel to a longitudinal slider center line 232. Inner edges 228 diverge from center line 232 at a first angle along leading portion 220 as inner edges 230 cross intersection 216. Inner edges 228 then diverge at a second, smaller angle from center line 232 along leg portion 222. Outer edges 230 extend from leading edge 202 in a direction parallel to center line 232 and then converge toward center line 232 along leading portion 220 as outer edges 230 cross intersection 216. Outer edges 230 then diverge from centerline 232 along leg portion 222.

A notch 240 is formed in a central region of leading contour 214 and extends from leading edge 202 to sub-ambient pressure cavity 212 for reducing the surface area of leading contour 214. Notch 240 has a tapered surface 242 which is generally parallel to and recessed from the surface of leading contour 214. Notch 240 has an upper surface 244 which is generally parallel to and recessed from the air bearing surfaces formed by rails 206 and 208. Surfaces 242 and 244 are recessed by a depth which is less than the depth of sub-ambient pressure cavity 212. Upper surface 244 defines cavity dam 210, which provides an air expansion path into cavity 212 for air that is compressed between the disc surface and leading contour 214. Inner edges 228 of side rails 206 and 208 define the side walls of notch 240. The side walls of notch 240 diverge from center line 232 as the side walls cross intersection 216.

Heads 246 and 248 are mounted at the trailing edges of inner rail 206 and outer rail 208, respectively. Head 248 is typically an active head, and head 246 is typically an inactive head. In a 2½ inch form factor disc drive, for example, a rotary actuator supports slider 200 such that longitudinal slider center line 232 is oriented at an angle relative to the tangent of disc rotation. At the disc inner diameter, this angle is typically about zero and can be slightly positive or slightly negative. As the actuator rotates to position slider 200 over various data tracks on the disc surface, the skew angle becomes generally negative. With a negative skew angle, air is curvilinearly swept under slider 200 at an angle 250 relative to center line 232, from inner rail 206 toward outer rail 208.

The high pressure developed by leading contour 214 at leading portion 220 of outer rail 208 is swept onto waist portion 224 and trailing portion 226 of outer rail 208, as shown by arrow 260. In contrast, the high pressure developed by leading contour 214 at leading portion 220 of inner rail 206 is swept away from waist portion 224 and trailing portion 226 of inner rail 206, as shown by arrows 262 and 264. Therefore, outer rail 208 is pressurized more effectively than inner rail 206, which induces slider 200 to roll generally about center line 232 such that outer rail 208 flies higher above the disc surface than inner rail 206.

Moreover, the air flowing across leading portion 220 of inner rail 206 is swept across the shallow notch 240 and into sub-ambient pressure cavity 212, as indicated by arrow 262. This creates a dual-stage expansion path which is very efficient for generating a self-loading force along inner rail 206. Because the self-loading force is more efficiently developed along inner rail 206 than outer rail 208, there is an additional roll bias created that forces the inner rail down toward the disc surface relative to the outer rail.

These fly roll biases are typically counteracted with an external roll torque by applying the preload force from the suspension at a point laterally displaced from the center of gravity of slider 200, which is known as a "load point roll offset." When a low preload is used for improved CSS performance, the roll torque applied by the preload may be insufficient to overcome the roll torque generated by the air bearing, even with a large roll offset. This produces a fly roll at the disc ID where inner rail 206 flies lower than outer rail 208. Disc fly roll reduces the spacing between the slider and disc, which increases the probability of slider-to-disc contact without providing a benefit in magnetic recording efficiency for a given outer rail fly height. Thus, the air bearing configuration shown in FIG. 2 has been found to be relatively unsuitable for low disc surface speed applications using a low preload, such as low power mobile disc drive applications.

Figure 3:
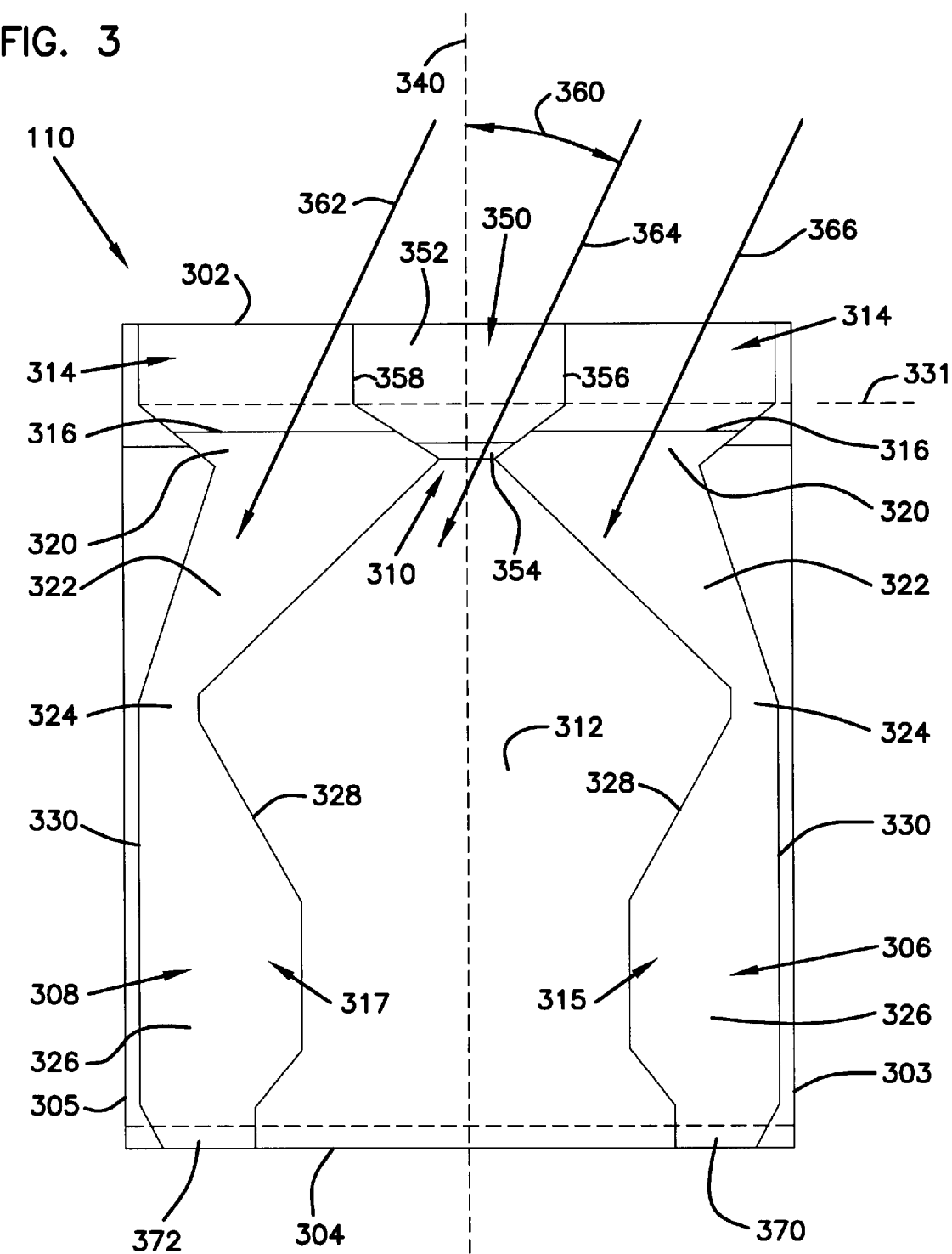
FIG. 3 is a plan view of a slider according to one embodiment of the present invention.

FIG. 3 is a plan view of slider 110 (shown in FIG. 1) according to one embodiment of the present invention in which the side walls of the notch are non-divergent from the slider center line as the side walls cross the intersection between the leading contour and the air bearing surfaces. Slider 110 includes leading edge 302, trailing edge 304, inner rail 306, outer rail 308, cavity dam 310, sub-ambient pressure cavity 312 and leading contour 314. Rails 306 and 308 form bearing surfaces 315 and 317, respectively. Leading contour 314 is lapped, milled or etched along leading edge 302 and extends from leading edge 302 to an intersection 316 with bearing surfaces 315 and 317.

Rails 306 and 308 each include a leading portion 320, a leg portion 322, a waist portion 324 and a trailing portion 326. Rails 306 and 308 have a minimum rail width along waist portion 324 and widen along leg portion 322, from waist portion 324 toward leading portion 320. Rails 306 and 308 also widen along trailing portion 326, from waist portion 324 toward trailing edge 304. Outer edges 330 are offset from slider side edges 303 and 305 toward center line 340, just downstream of leading contour 314. This causes leg portions 322 to angle inward toward center line 340. Offsetting outer edges 330 of rails 306 and 308 toward the center of slider 110 along leg portions 322 result in the disc tangential velocity intersecting leg portions 322 at an angle. This "angled leading rail" configuration results in a reduction of the flying height at the disc middle diameter (MDFH), thereby improving the recording bit density on the middle data tracks in the disc drive.

Rails 306 and 308 further include inner edges 328 and outer edges 330. Outer edges 330 extend from leading edge 302 to a longitudinal position 331 in a direction parallel to longitudinal slider center line 340. Along leading portion 320, outer edges 330 converge toward center line 340 as the outer edges extend from position 331 to leg portions 322. Outer edges 322 then diverge from center line 340 along leg portion 322 as the outer edges extend toward waist portion 324.

Inner edges 328 extend from leading edge 302 to position 331 in a direction parallel to longitudinal slider center line 340. Along leading portion 320, inner edges 330 converge toward center line 340 as the inner edges extend from position 331 to leg portions 322. Inner edges 322 then diverge from center line 340 along leg portions 322 as the inner edges extend toward waist portions 324.

A notch 350 is positioned within a central region of leading contour 314 and extends from leading edge 302, through cavity dam 310, to sub-ambient pressure cavity 312. Notch 350 has a tapered surface 352 which is generally parallel to and recessed from the surface of leading contour 314. Notch 350 has an upper surface 354 which is generally parallel to and recessed from air bearing surfaces 315 and 317. Surfaces 352 and 354 are recessed by a depth which is less than the depth of sub-ambient pressure cavity 312. Upper surface 354 defines cavity dam 310, which provides an air expansion path into cavity 312 for air that is compressed between the disc surface and leading contour 314.

Notch 350 has vertical side walls 356 and 358 which extend from leading edge 302 to sub-ambient pressure cavity 312 and are defined by inner edges 328 of rails 306 and 308. Each plane that is tangent to vertical side walls 356 and 358 at intersection 316 converges with, or at least does not diverge from, center line 340 in a direction from leading edge 302 toward trailing edge 304. This configuration can be referred to as a non-divergent notch edge.

The combination of the angle leading rails along leg portions 322 and the non-divergent notch edge across intersection 316 reduces undesirable roll of slider 110 about center line 340 in embodiments in which cavity 322 has a shallow depth and the suspension to which slider 110 is attached applies a low preload force.

During operation, slider 110 flies at a skew angle 360 relative to the disc tangential velocity. Air dragged by the disc surface passes under slider 110 in a direction indicated by arrows 362, 364 and 366. As discussed above with reference to FIG. 2, the angled rail configuration of leg portions 322 pressurizes outer rail 308 more effectively than inner rail 306. This causes slider 110 to roll about center line 340. The non-divergent side walls 356 and 358 of notch 350 reduce this roll effect in two ways. First, non-divergent side walls 356 and 358 provide more area on leading portions 320 of rails 306 and 308 on which to generate lift force before the high pressure developed by leading contour 314 is swept into cavity 312. Since slider 110 flies at skew angle 360, inner rail 306 benefits more from the increased pressurization at leading portion 320 than outer rail 304. This tends to reduce the roll effect caused by the angled leading rail configuration of leg portions 322.

Second, there is essentially no dual-stage air expansion path from leading portion 320 of inner rail 306 to cavity 312, across notch 350. This minimizes any self-loading roll bias since the self-loading force is developed with essentially the same efficiency near inner rail 306 as near outer rail 308. The net result is a desired inner radius fly attitude in which the fly height of inner rail 306 is substantially the same as, or higher than, outer rail 308.

In the embodiment shown in FIG. 3, rails 306 and 308 extend all the way to trailing edge 304. Recording heads 370 and 372 are fabricated on the trailing edges of rails 306 and 308, respectively, for communicating with the disc surface. In one embodiment, recording head 372 is active and recording head 370 is inactive. Since a symmetric slider design allows either rail to be denominated as the outer rail by assigning the disc surface to be used as an "up facing" or "down facing" disc surface, a symmetric slider design improves wafer process yield by offering two heads per slider. Two heads provides redundancy in the head wafer manufacturing process.

In one embodiment, notch 350 has a depth of about 1 micrometer and sub-ambient pressure cavity 312 has a depth of about 2–4 micrometers. Other depths can also be used. Leading taper 314 can include a traditional tapered surface or a "stepped" surface which is generally parallel to and recessed from the air bearing surfaces. With a stepped surface, section 352 of notch 350 would be stepped such that section 352 is recessed from and parallel to the stepped surfaces of leading taper 314. The term "leading contour" as used in the specification and the claims therefore includes a traditional tapered surface, a stepped surface or another suitable surface shape. The stepped surfaces can be formed by ion milling, chemical etching, or Reactive Ion Etching (RIE), for example, during the fabrication of rails 306 and 308 and cavity 312. These stepped surfaces have depths of about 1 micrometer or less, for example.

Figure 4:
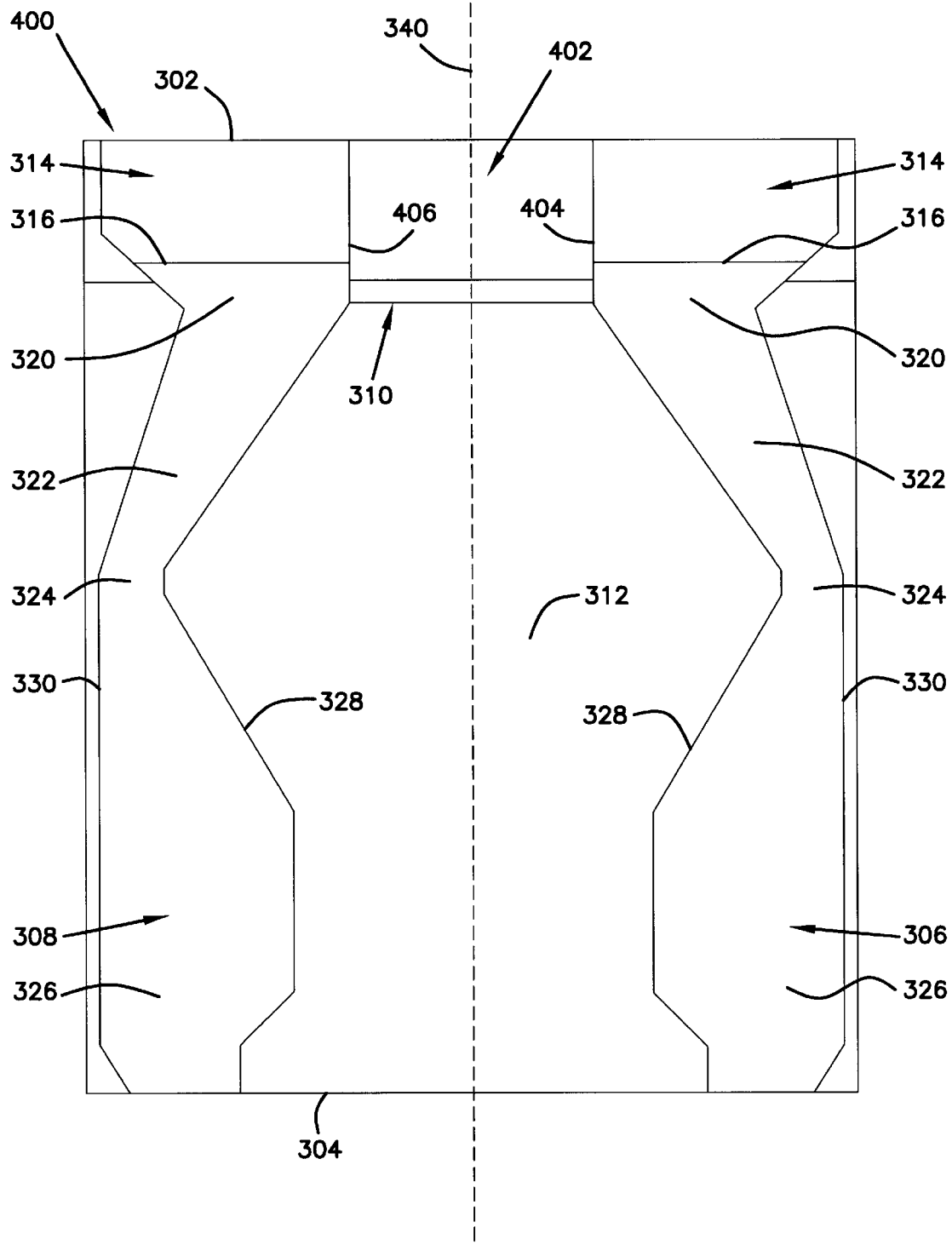
FIG. 4 is a plan view of a slider according to another embodiment of the present invention.

FIG. 4 is a plan view of a disc head slider according to an alternative embodiment of the present invention. The same reference numerals are used in FIG. 4 as were used in FIG. 3 for the same or similar elements. Slider 400 includes notch 402 which is positioned within a central region of leading contour 314 and extends from leading edge 302 toward sub-ambient pressure cavity 312. Notch 402 has vertical side walls 404 and 406 which are defined by inner edges 328 of rails 306 and 308, respectively. Side walls 404 and 406 extend parallel to center line 340, from leading edge 302 to the trailing edge of cavity dam 310. Therefore, each plane that is tangent to side walls 404 and 406 is parallel to and non-divergent from center line 340 at intersection 316.

Figure 5:
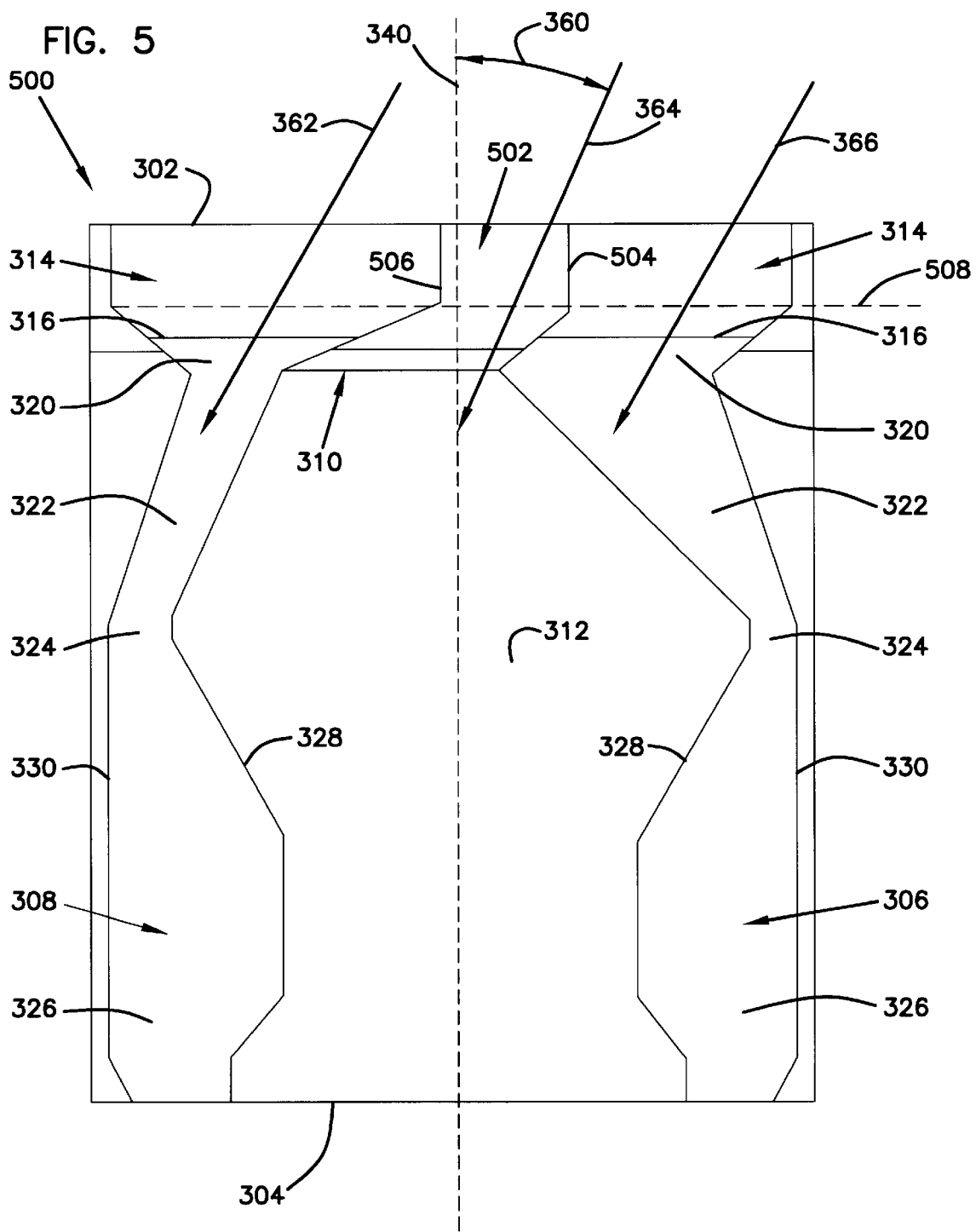
FIG. 5 is a plan view of a slider according to another embodiment of the present invention.

FIG. 5 is a plan view of a slider according to another alternative embodiment of the present invention. The same reference numerals are used in FIG. 5 as were used in FIGS. 3 and 4 for the same or similar elements. Slider 500 includes notch 502 which is positioned within a central region of leading contour 314 and extends from leading edge 302 toward sub-ambient pressure cavity 312. Notch 502 has vertical side walls 504 and 506 which are defined by inner edges 328 of rails 306 and 308, respectively. Side walls 504 and 506 extend parallel to center line 340, from leading edge 302 to a longitudinal position 508 along center line 340. From position 508, side wall 504 converges toward center line 340 and side wall 506 diverges from center line 340 as the side walls extend to the trailing edge of cavity dam 310.

Since slider 500 flies at skew angle 360 with respect to the disc tangential velocity, inner rail 506 remains the primary beneficiary of the increased pressurization of leading portion 320 caused by the increased surface area of non-diverging side wall 504. Also, there is essentially no dual-stage air expansion path from leading contour 314 to sub-ambient pressure cavity 312.

FIG. 6 is a plan view of a slider according to yet another alternative embodiment of the present invention. Slider 600 is similar to slider 110 shown in FIG. 3, but the recording head is carried by a center island and the side rails terminate prior to the trailing edge of the slider. Slider 600 includes leading edge 602, trailing edge 604, side edges 606 and 608 and center line 610. Slider 600 further includes inner rail 612, outer rail 614, center island 616, cavity dam 618 and sub-ambient pressure cavity 620. Cavity dam 618 extends between rails 612 and 614. Rails 614 and 612 are positioned along side edges 606 and 608, respectively, and form air bearing surfaces 622 and 624, respectively. Rails 614 and 612 each include a leading portion 660, a leg portion 662, a waist portion 664, and a trailing portion 666. Center island 616 supports a recording head 626 near trailing edge 604 for communicating with the disc surface.

Leading contour 630 is formed along leading edge 602 and extends from leading edge 602 to an intersection 632 with bearing surfaces 622 and 624. Notch 640 is positioned within a central region of leading contour 630 and extends from leading edge 602 to sub-ambient pressure cavity 620. Notch 640 has vertical side walls 642 and 644 which extend from leading edge 602 to the trailing edge of cavity dam 618 and are defined by inner edges 646 of inner rail 612 and outer rail 614. Once again, notch walls 642 and 644 are non-divergent from center line 610 as side walls 642 and 644 cross intersection 632.

The slider of the present invention has acceptable contact-start-stop (CSS) performance, reduced ID-to-OD fly height variance and reduced fly height loss with altitude. The slider of the present invention also has a substantially zero fly pitch sensitivity to skew angle. For a center pad slider such as that shown in FIG. 6, this translates to reduced sensitivity of the fly height to the seek velocity since pitch sensitivity is a key element of fly height sensitivity. Reduced fly height change during seek operations (i.e. movement of the slider from one data track to another data track on the disc surface) improves the head settle time and therefore the disc drive performance.

The slider of the present invention maintains the slider body attitude during operation such that both the active rail fly height variation and the slider-disc separation margin are improved in low power mobile disc drive products over a range of environmental conditions. The slider supports low disc speed operations for reduced power consumption and has improved disc drive tribology performance.

In summary, one aspect of the present invention relates to a slider 110, 400, 500, 600 first and second raised bearing surfaces 315/317, 622/624, respectively. Each bearing surface has outside bearing edges 330, 628, a leading portion 320, 660, a waist portion 324, 664 and a leg portion 322, 662. The outside bearing edges 330, 628 diverge from one another along the leg portion 322, 662, from the leading portion 320, 660 toward the waist portion 324, 664. A cavity dam 310, 618 defines a sub-ambient pressure cavity 312, 620 between the first and second bearing surfaces 315/317, 622/624. A leading contour surface 314, 630 extends from the leading slider edge 302, 602 to an intersection 316, 632 with the first and second bearing surfaces 315/317, 622/624. A notch 350, 402, 502, 640 is positioned within a central region of the leading contour 314, 630, between the first and second bearing surfaces 315/317, 622/624, and has first and second side walls 356/358, 404/406, 504/506, 642/644 which extend from the leading slider edge 302, 602 to the sub-ambient pressure cavity 312, 620, through the cavity dam 310, 618. At least one of the side walls is non-divergent from the slider center line 340, 610 at the intersection 316, 632 in a direction from the leading slider edge 302, 602 toward the trailing slider edge 304, 604.

In the embodiments shown in FIGS. 3, 4 and 6, both the first and second side walls 356/358, 404/406, 642/644 are non-divergent from the slider center line 340, 610 at the intersection 316, 632 in the direction from the leading slider edge 302, 602 toward the trailing slider edge 304, 604. For example, in one embodiment, the first and second side walls extend parallel to the slider center line 340, 610 from the leading slider edge 302, 602 to the sub-ambient pressure cavity 312, 620. In another embodiment, the first and second side walls converge toward the slider center line 340, 610 at the intersection 316, 632 in the direction from the leading slider edge 302, 602 toward the trailing slider edge 304, 604. The first and second side walls extend parallel to the slider center line 340, 610 from the leading slider edge 302, 602 to a longitudinal position 331 between the leading slider edge 302, 602 and the intersection 316, 632 and then converge toward the slider center line 340, 610 from the longitudinal position to the sub-ambient pressure cavity 312, 620.

In the embodiment shown in FIG. 5, the first side wall 504 is non-divergent from the slider center line 340 at the intersection 316 in the direction from the leading slider edge 302 toward the trailing slider edge 304 and the second side wall 506 diverges from the slider center line 340 at the intersection 316 in the direction from the leading slider edge 302 toward the trailing slider edge 304. In this embodiment, the first and second side walls 504/506 extend parallel to the slider center line 340 from the leading slider edge 302 to a longitudinal position 508 between the leading slider edge 302 and the intersection 316. The first side wall 504 converges toward the slider center line from the longitudinal position 508 to the sub-ambient pressure cavity 312. The second side wall 506 diverges from the slider center line 340 from the longitudinal position 508 to the sub-ambient pressure cavity 312.

Another aspect of the present invention relates to a disc drive assembly 100 as shown in FIG. 1. The assembly 100 includes a housing 102, a disc 106 which is mounted in the housing 102 for rotation about a central axis 109, a rotary slider support structure 116 which is rotatably mounted in the housing 102, and a slider 110, 400, 500 600 which is supported over the disc 106 by the rotary slider support structure 116.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the geometry and proportion of the notch and the bearing rails can be modified in alternative embodiments, particularly in terms of asymmetry about the longitudinal center line of the slider body. Other modification scan also be made without departing from the scope and spirit of the present invention.

What is claimed is:

1. A self-loading disc head slider comprising:

first and second raised bearing surfaces comprising a leading portion, a trailing portion, a waist portion, which is positioned between and narrower than the leading and trailing portions, and a leg portion, which extends from the leading portion to the waist portion, wherein the first and second raised bearing surfaces further comprise outside bearing edges which diverge from one another along the leg portion as the leg portion extends from the leading portion to the waist portion and wherein the leg portions are offset toward one another relative to the waist portions of the first and second raised bearing surfaces;

a cavity dam defining a sub-ambient pressure cavity between the first and second bearing surfaces;

a leading contour extending from a leading slider edge to an intersection with the first and second bearing surfaces; and a notch positioned in the cavity dam within a central region of the leading contour between the first and second bearing surfaces and having a notch floor, which is recessed from the first and second raised bearing surfaces and is raised from the sub-ambient pressure cavity, and first and second side walls, which extend from the leading slider edge to the sub-ambient pressure cavity, through the cavity dam, wherein at least one of the side walls is non-divergent from a longitudinal slider center line at the intersection in a direction from the leading slider edge toward a trailing slider edge.

2. The self-loading slider of claim 1 wherein the first and second bearing surfaces further comprise inside bearing edges which diverge from the longitudinal slider center line along the leg portion, from the leading portion toward the waist portion of the respective first and second bearing surfaces.

3. The self-loading slider of claim 1 wherein both the first and second side walls are non-divergent from the longitudinal slider center line at the intersection in the direction from the leading slider edge toward the trailing slider edge.

4. The self-loading slider of claim 3 wherein the first and second side walls extend parallel to the longitudinal slider center line from the leading slider edge to the sub-ambient pressure cavity.

5. The self-loading slider of claim 3 wherein the first and second side walls converge toward the longitudinal slider center line at the intersection in the direction from the leading slider edge toward the trailing slider edge.

6. The self-loading slider of claim 5 wherein:

the first and second side walls extend parallel to the longitudinal slider center line from the leading slider edge to a longitudinal position between the leading slider edge and the intersection; and the first and second side walls converge toward the longitudinal slider center line from the longitudinal position to the sub-ambient pressure cavity.

7. The self-loading slider of claim 1 wherein:

the first side wall is non-divergent from the longitudinal slider center line at the intersection in the direction from the leading slider edge toward the trailing slider edge; and the second side wall diverges from the longitudinal slider center line at the intersection in the direction from the leading slider edge toward the trailing slider edge.

8. The self-loading slider of claim 7 wherein:

the first and second side walls extend parallel to the longitudinal slider center line from the leading slider edge to a longitudinal position between the leading slider edge and the intersection;

the first side wall converges toward the longitudinal slider center line from the longitudinal position to the sub-ambient pressure cavity; and the second side wall diverges from the longitudinal slider center line from the longitudinal position to the sub-ambient pressure cavity.

9. The self-loading slider of claim 1 wherein the first and second raised bearing surfaces extend to the trailing slider edge and the self-loading slider further comprises first and second transducers carried by the first and second raised bearing surfaces, respectively, at the trailing slider edge.

10. The self-loading slider of claim 1 wherein the first and second raised bearing surfaces terminate prior to the trailing slider edge and the self-loading slider further comprises:

a raised center island positioned at the trailing slider edge along the longitudinal slider center line; and a transducer carried by the raised center island.

11. A disc drive assembly comprising:

a housing;

a disc mounted in the housing for rotation about a central axis;

a rotary slider support structure rotatably mounted in the housing; and a slider supported over the disc by the rotary slider support structure and comprising:

leading and trailing slider edges;

a slider center line extending from the leading slider edge to the trailing slider edge;

first and second raised bearing surfaces comprising and inside and outside bearing edges, a leading portion, a waist portion and a leg portion, wherein the outside bearing edges diverge from the slider center line along the leg portion, from the leading portion toward the waist portion, which offsets the leg portions toward one another relative to the waist portions;

a cavity dam extending between the first and second raised bearing surfaces;

a leading contour extending from the leading slider edge to an intersection with the first and second bearing surfaces;

a sub-ambient pressure cavity positioned between the cavity dam and the trailing slider edge; and a notch positioned in the cavity dam within a central region of the leading contour between the first and second raised bearing surfaces and having a notch floor which is recessed from the first and second raised bearing surfaces and is raised from the sub-ambient pressure cavity, and first and second side walls, which extend from the leading slider edge to the sub-ambient pressure cavity, through the cavity dam, wherein at least one of the side walls is non-divergent from the slider center line at the intersection in a direction from the leading slider edge toward the trailing slider edge.

12. The disc drive assembly of claim 11 wherein the inside bearing edges diverge from the slider center line along the leg portion, from the leading portion toward the waist portion.

13. The disc drive assembly of claim 11 wherein both the first and second side walls are non-divergent from the slider center line at the intersection in the direction from the leading slider edge toward the trailing slider edge.

14. The disc drive assembly of claim 13 wherein the first and second side walls extend parallel to the slider center line from the leading slider edge to the sub-ambient pressure cavity.

15. The disc drive assembly of claim 13 wherein the first and second side walls converge toward the slider center line at the intersection in the direction from the leading slider edge toward the trailing slider edge.

16. The disc drive assembly of claim 15 wherein:

the first and second side walls extend parallel to the slider center line from the leading slider edge to a longitudinal position between the leading slider edge and the intersection; and the first and second side walls converge toward the slider center line from the longitudinal position to the sub-ambient pressure cavity.

17. The disc drive assembly of claim 11 wherein:

the disc has an inner diameter, an outer diameter and a disc rotation tangent;

the first raised bearing surface is an inner bearing surface which is positioned closer to the inner diameter than the second raised bearing surface;

the second raised bearing surface is an outer bearing surface which is positioned closer to the outer diameter than the first raised bearing surface;

the rotary slider support structure supports the slider with the slider center line at skew with respect to the disc rotation tangent such that the inner bearing surface is generally upstream from the outer bearing surface with respect to the disc rotation tangent;

the first side wall extends along the leading portion of the inner bearing surface and is non-divergent from the slider center line at the intersection in the direction from the leading slider edge toward the trailing slider edge; and the second side wall extends along the leading portion of the outer bearing surface and diverges from the slider center line at the intersection in the direction from the leading slider edge toward the trailing slider edge.

18. The disc drive assembly of claim 17 wherein:

the first and second side walls extend parallel to the slider center line from the leading slider edge to a longitudinal position between the leading slider edge and the intersection;

the first side wall converges toward the slider center line from the first longitudinal position to the sub-ambient pressure cavity; and the second side wall diverges from the slider center line from the first longitudinal position to the sub-ambient pressure cavity.

* * * * *